(12) United States Patent
Kimble

(10) Patent No.: US 8,169,182 B1
(45) Date of Patent: May 1, 2012

(54) CHARGING SYSTEM FOR AN ELECTRIC VEHICLE

(76) Inventor: Denny Kimble, Aurora, CO (US)

( * ) Notice: Subject to any disclaimer, the term of this patent is extended or adjusted under 35 U.S.C. 154(b) by 380 days.

(21) Appl. No.: 12/455,477

(22) Filed: Jun. 2, 2009

Related U.S. Application Data

(60) Provisional application No. 61/130,526, filed on Jun. 2, 2008.

(51) Int. Cl.
*H02J 7/00* (2006.01)
(52) U.S. Cl. .......................... 320/101; 290/44
(58) Field of Classification Search .................. 320/101
See application file for complete search history.

(56) References Cited

U.S. PATENT DOCUMENTS

| | | | |
|---|---|---|---|
| 4,039,849 A * | 8/1977 | Mater et al. | 290/55 |
| 4,211,930 A | 7/1980 | Fengler | |
| 4,951,769 A | 8/1990 | Kawamura | |
| 5,771,478 A | 6/1998 | Tsukamoto et al. | |
| 6,138,781 A * | 10/2000 | Hakala | 180/2.2 |
| 6,605,880 B1 | 8/2003 | Jaunich | |
| 6,756,693 B2 * | 6/2004 | Kennedy | 290/1 A |
| 6,806,687 B2 | 10/2004 | Kajiura | |
| 6,857,492 B1 * | 2/2005 | Liskey et al. | 180/165 |
| 6,897,575 B1 * | 5/2005 | Yu | 180/65.265 |
| 7,019,413 B2 | 3/2006 | Kinoshita | |
| 7,087,327 B2 * | 8/2006 | Pearson | 320/101 |
| 7,147,069 B2 * | 12/2006 | Maberry | 180/2.2 |

* cited by examiner

*Primary Examiner* — Melissa Koval
*Assistant Examiner* — Robert Grant
(74) *Attorney, Agent, or Firm* — Montgomery Patent & Design, LLC; Robert C. Montgomery; Joseph T. Yaksich

(57) ABSTRACT

A system that produces electrical power for an electric vehicle while in motion, utilizing a roof-mounted ductwork, is herein disclosed. The ductwork tunnel comprises a plurality of fan alternator assemblies which rotate due to an air flow therethrough, thereby producing an electrical current which is in-turn used to charge a plurality of on-board batteries and alternately to provide power directly thereto the electric motor portion of the electric vehicle.

17 Claims, 10 Drawing Sheets

CHARGING SYSTEM FOR AN ELECTRIC VEHICLE

RELATED APPLICATIONS

The present invention was first described in and claims the benefit of U.S. Provisional Application No. 61/130,526, filed Jun. 2, 2008, the entire disclosures of which are incorporated herein by reference.

FIELD OF THE INVENTION

The present invention relates generally to power generation for motor vehicles, and more particularly, to a power generation and charging system for an electric vehicle utilizing air flow created while the vehicle is in motion.

BACKGROUND OF THE INVENTION

Mankind has always depended upon nature's stores of resources to provide the source of energy to build, explore, and experiment. As our knowledge and technology have improved we have moved from the burning of wood, coal, oil, and gas to harnessing the power of the atom to provide nuclear energy. Unfortunately, each form of energy that has been discovered has associated disadvantages such as, pollution, destruction of the ozone layer, nuclear contamination, accidental release of harmful radiation and the like. Mankind continues to seek better, more efficient forms of energy and with global energy consumption increasing at alarming rates, the need for a clean, renewable source of energy is more important than ever.

Traditional sources of producing energy from the combustion of fossil fuels is not only expensive but has become widely accepted as a main contributor to a rise in the greenhouse gas carbon dioxide believed to be a cause of global climate change. The goal has been to find an energy source that does not require replenishment, does not consume natural resources, is continuous, does not possess deleterious side effects and does not emit pollutants and renewable sources of clean energy from wind, water, and solar offer an alternative. Unfortunately many renewable energy sources suffer from deficiencies in efficiency do to their intermittent nature and cost. This also makes their use impractical for one of the most common consumers of energy, the automobile. An average household with two (2) mid-sized vehicles emits more than twenty thousand (20,000) pounds of carbon dioxide per year. Attempts to improve the fuel efficiency of the internal combustion engine are slow and producing lighter vehicles negatively impact the safety of passengers. Efficiency of electricity storage devices for electric vehicles currently only provides for short periods of operation and hybrid vehicles still utilize gasoline engines.

Examples of relevant attempts to provide power generation to vehicles and address these problems can be seen by reference to several U.S. patents, including: U.S. Pat. No. 4,211,930, issued in the name of Fengler, which describes a vehicle propulsion system by individual stepping motors from continuously-running engine-driven alternator and/or pulsating battery current; U.S. Pat. No. 6,605,880, issued in the name of Jaunich, which describes an energy system providing continual electric power using wind-generated electricity coupled with fuel-driven electricity generators; U.S. Pat. No. 4,951,769, issued in the name of Kawamura, which describes a motor vehicle driving system; U.S. Pat. No. 5,771,478, issued in the name of Tsukamoto et al., which describes a vehicle drive system with electrical power regeneration; U.S. Pat. No. 6,806,687, issued in the name of Kajiura, which describes a vehicle motor-generator apparatus utilizing synchronous machine having field winding; and U.S. Pat. No. 7,019,413, issued in the name of Kinoshita, which describes a system having an electric device which functions both as an electric motor for driving machines and as a generator to generate electrical power, and having a power source for driving the electric device.

While these devices fulfill their respective, particular objectives, each of these references suffers from one (1) or more of the aforementioned disadvantages. Accordingly, there is a need for a means by which energy can be produced that is continuous in nature, does not require the consumption of natural resources or other replenishment and produces no pollution or other deleterious side effects. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide power to operate a motor vehicle through the use of renewable wind power utilizing the energy produced while the vehicle is in motion and thus, the object of the present invention is to solve the aforementioned disadvantages and provide for this need.

To achieve the above objectives, it is an object of the present invention to provide an air-movement powered charging system for electric motor vehicles that utilizes a flow of air, which flows across a moving electric vehicle to produce electrical power that used to provide the motion of the electric vehicle.

Another object of the air-movement powered charging system for electric motor vehicles is to provide a system comprising a roof-mounted air tunnel assembly that directs an air flow through six (6) fan assemblies mounted within the tunnel assembly, an automatic microprocessor system control module, a voltage regulator, a plurality of rechargeable batteries, and a dashboard-mounted system monitor.

Yet still another object of the air-movement powered charging system for electric motor vehicles is to provide a tunnel assembly that is mounted to a roof portion of the electric vehicle comprising a lower enclosure, a removable upper panel, a front panel, a rear panel, a front opening, a rear opening, a heating coil, a front and rear louver, and a front and rear screen panel and provides a means of compression and velocity control via a motorized front and rear louvers to an incoming flow of air traveling across a hood and a windshield of the electric vehicle. The removable upper panel provides a means to access the internal components of system. The air enters the front opening and passes through the tunnel assembly and is compressed via a plurality of stationary baffle plates directing the air toward and causing the rotation of the six (6) horizontal cage-type fan assemblies located within and exits through the rear opening.

Yet still another object of the air-movement powered charging system for electric motor vehicles is to provide a fan assembly comprising a fan frame, a fan bearing, a pair of fan hubs, a plurality of fan spokes, a plurality of fan blades, an alternator, and an alternator shaft that produces an output electrical current, which is in-turn used to power an electric motor of the vehicle or charge a plurality of on-board batteries, thereby enabling the electric vehicle to travel greater distances. Each fan assembly is affixed to the upper removable panel and the lower enclosure a fan bearing and an alternator mounting bracket.

Yet still another object of the air-movement powered charging system for electric motor vehicles is to provide a motorized louver located at both the front and rear openings of the tunnel assembly that provides a means to variably regulate a flow of air through the tunnel openings.

Yet still another object of the air-movement powered charging system for electric motor vehicles is to provide an air heating coil located at the front and rear openings that melt snow or ice that may enter the tunnel assembly during inclement weather conditions. The air heating coils work in conjunction with a temperature sensor that provides temperature monitoring of air flowing through the tunnel assembly.

Yet still another object of the air-movement powered charging system for electric motor vehicles is to provide a system control module that provides overall control of the system and monitors the alternators and the temperature sensor and outputs the data to the system monitor.

Yet still another object of the air-movement powered charging system is to provide a system monitor comprising a housing, a display, and a plurality of control buttons that provides a user a means to monitor various system parameters such as, battery charge level, system activation or deactivation status, air flow volume, system faults, and the like.

Yet still another object of the air-movement powered charging system is to provide a voltage regulator assembly that insures that the batteries receive equivalent amperage and voltage at all times during operation since each alternator may produce a slightly different current level.

Yet still another object of the air-movement powered charging system is to provide a method of utilizing the system that provides for virtually unlimited clean, quiet and free electrical power for use with any energy need.

Further objects and advantages of the air-movement powered charging system will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
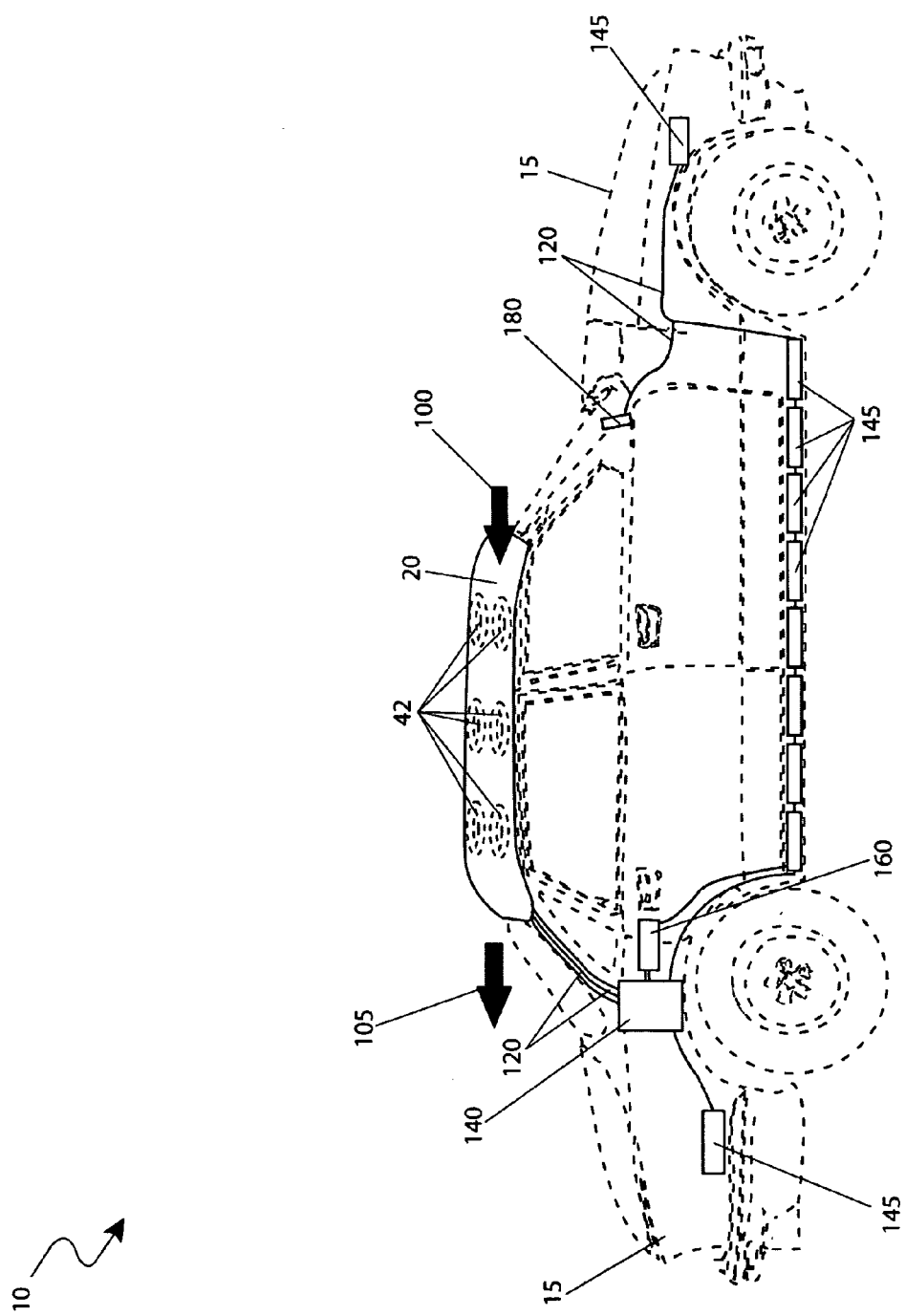
FIG. 1 is a side view of an air movement-powered charging system for electric motor vehicles 10 depicting installation therewithin an electric vehicle 15, according to the preferred embodiment of the present invention.

| | |
|---|---|
| 10 | air-movement powered charging system for electric motor vehicles |
| 15 | electric vehicle |
| 20 | tunnel assembly |
| 22 | upper removable panel |
| 23 | lower enclosure |
| 24 | front tunnel panel |
| 25 | rear tunnel panel |
| 26 | front tunnel opening |
| 28 | rear tunnel opening |
| 30 | motorized louver |
| 34 | louver motor |
| 35 | louver shaft |
| 36 | bracket |
| 42 | fan assembly |
| 44 | fan frame |
| 46 | fan blade |
| 47 | fan spoke |
| 48 | fan hub |
| 49 | fan bearing |
| 50 | alternator |
| 52 | alternator shaft |
| 54 | alternator mounting bracket |
| 58 | screen panel |
| 62 | air heating coil |
| 66 | temperature sensor |
| 68 | mounting bracket |
| 80 | baffle plate |
| 100 | entering air |
| 105 | exiting air |
| 110 | common fastener |
| 111 | fastener aperture |
| 112 | weld stud fastener |
| 114 | locknut fastener |
| 116 | hinge |
| 118 | gasket seal |
| 120 | electrical wiring |
| 140 | voltage regulator assembly |
| 145 | battery |
| 160 | system control module |
| 180 | system monitor |
| 185 | display |
| 190 | input buttons |
| 200 | electric vehicle motor |
| 205 | electric vehicle power controller |

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an air-movement powered charging system for electric motor vehicles (herein described as the "system") 10, which utilizes a flow of air 100 which flows across a moving electric vehicle 15 to produce electrical power used to motion said electric vehicle 15. The system 10 comprises a roof-mounted air tunnel assembly 20 to direct said air 30 therethrough which engages six (6) fan assemblies 42 mounted therewithin. Each fan assembly 42 comprises an integral alternator 50 which produces an output electrical current which is in-turn used to power an electric motor portion 200 of the vehicle 15 and/or charge a plurality of on-board batteries 145, thereby allowing the electric vehicle 15 to travel greater distances. The system 10 further provides automatic microprocessor control and a dashboard-mounted monitor 180.

Referring now to FIG. 1, a side view of the system 10 installed therein an electric motor vehicle 15, according to the preferred embodiment of the present invention, is disclosed. The system 10 as illustrated here, depicts internal wiring 120 and major components installed therein respective locations therewithin and thereupon said electric vehicle 15 depicting a typical installation; however, it is understood that any number of different equipment arrangements of system 10 components may be provided based upon different electric vehicle models 15, electrical output current requirements, and the like, and as such should not be a limiting factor of the system 10. The system 10 is depicted here being installed therewithin a generic electric motor vehicle 15; however, it should be noted that any type or style electric vehicle 15, including a sport utility van, van, truck, bus, off-road vehicle, emergency vehicles, and the like, may utilize the system 10 and as such should not be interpreted as a limiting factor of the present invention. The system 10 comprises a tunnel assembly 20, six (6) fan assemblies 42, a voltage regulator assembly 140, a system control module 160, a plurality of batteries 145, and a dashboard-mounted system monitor 180. The tunnel assembly 20 comprises a generally rectangular open-ended box providing internal compression and velocity control thereto a flow of entering air 100 which travels across hood and windshield portions of the electric vehicle 15 before entering a front tunnel opening portion 24 of said tunnel assembly 20. The tunnel assembly 20 is approximately four (4) to six (6) feet wide and approximately six (6) to eight (8) feet long and approximately four (4) to eight (8) inches in height. Said entering air 100 passes therethrough said tunnel assembly 20 subsequently causing rotation thereof the six (6) horizontal cage-type fan assemblies 42 located therewithin, before being exhausted as exiting air 105 via a rear tunnel opening 28.

Figure 2A:
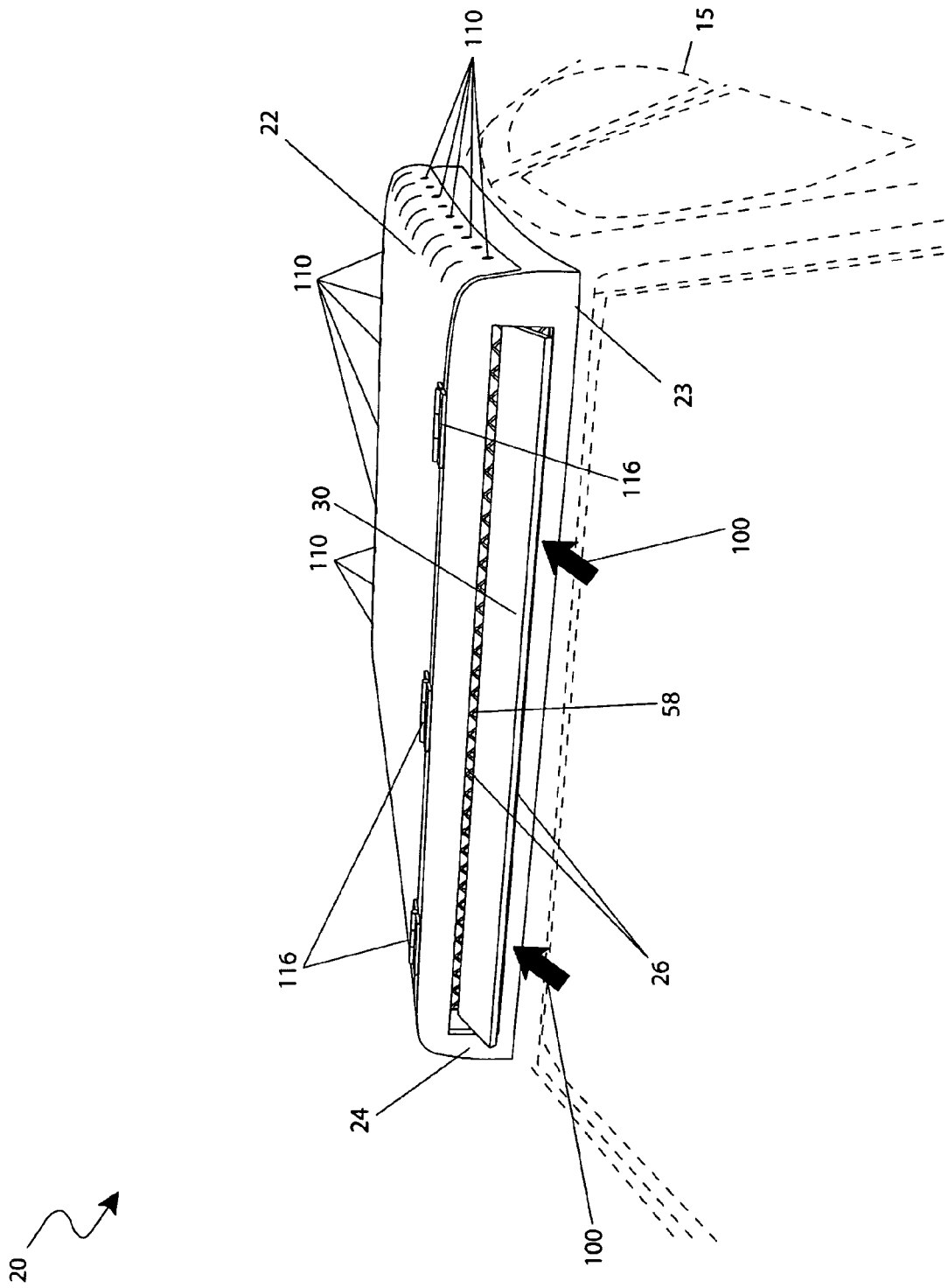
FIG. 2a is a front perspective view of a tunnel assembly portion 20 of the air movement-powered charging system for electric motor vehicles 10, according to the preferred embodiment of the present invention.
Figure 2B:
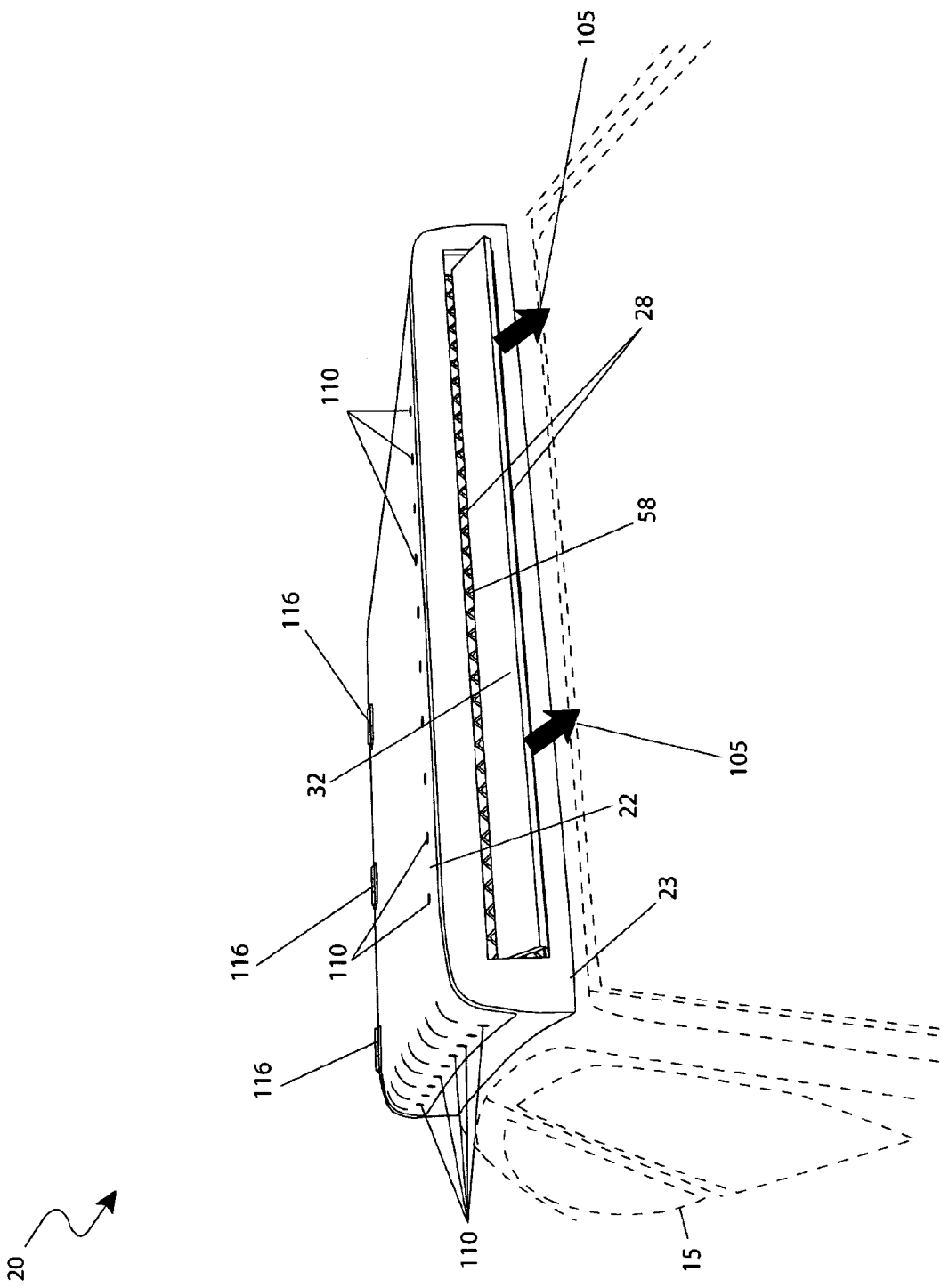
FIG. 2b is a rear perspective view of a tunnel assembly portion 20 of the air movement-powered charging system for electric motor vehicles 10, according to the preferred embodiment of the present invention.
Figure 2C:
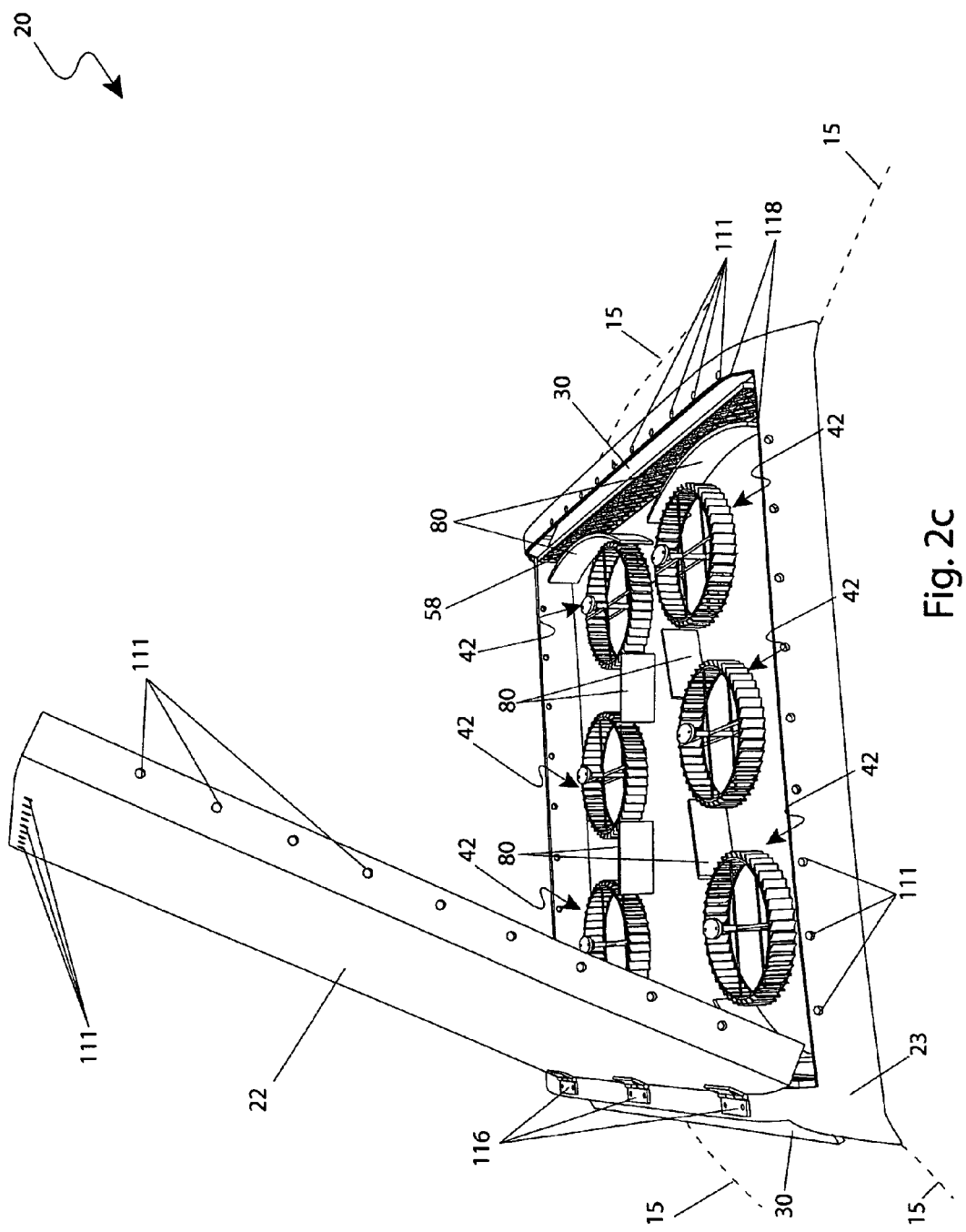
FIG. 2c is a top cut-away view of the tunnel assembly portion 20 of the air movement-powered charging system for electric motor vehicles 10 depicting an arrangement of internal fan assemblies 42, according to the preferred embodiment of the present invention.
Figure 2D:
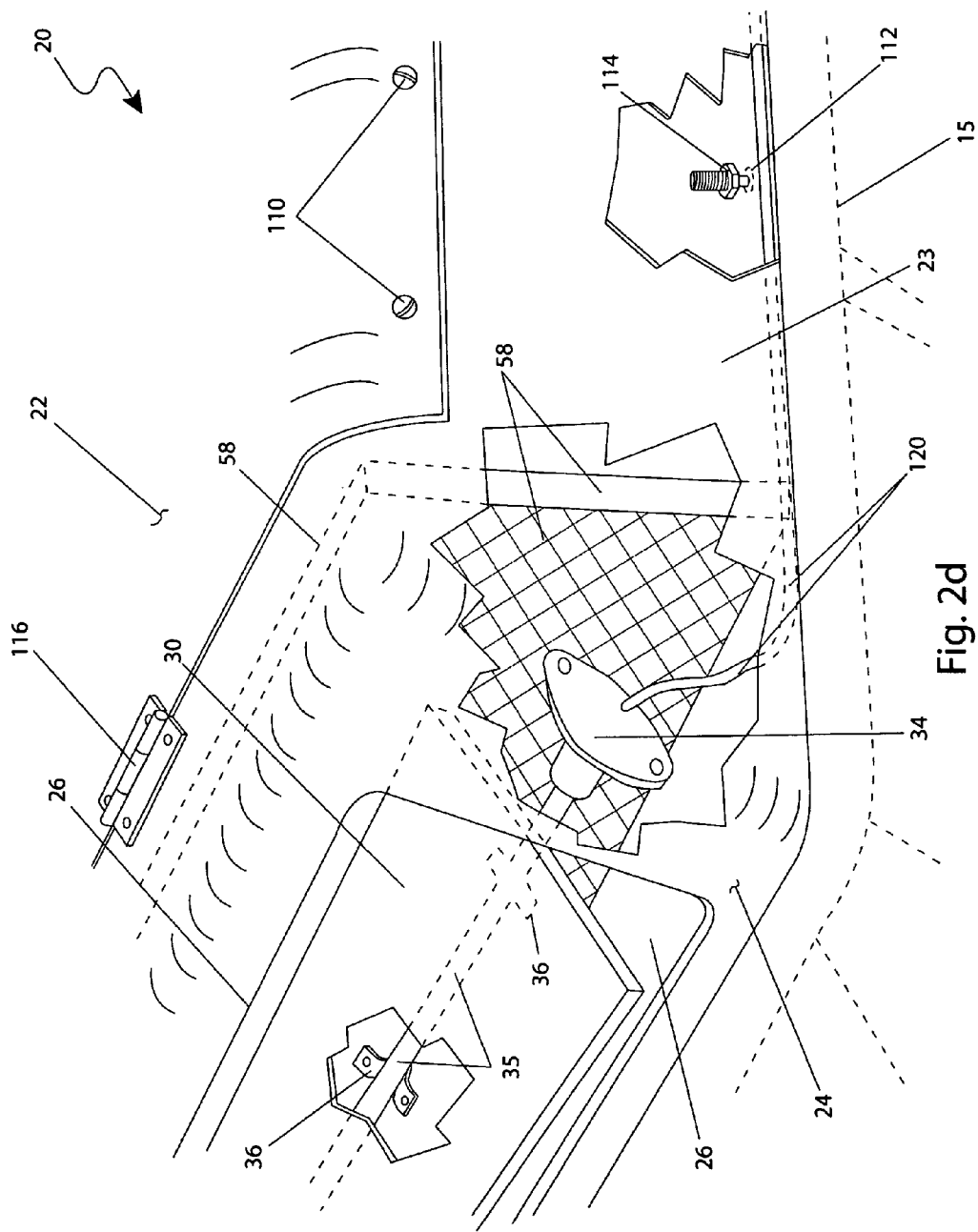
FIG. 2d is a close-up view of a front louver portion 30 of the air movement-powered charging system for electric motor vehicles 10, according to the preferred embodiment of the present invention.

The flow of air 100, 105 therethrough the front 24 and rear 28 tunnel openings is regulated via a pair of respective motorized louvers 30 (see FIGS. 2*a*, 2*b*, 2*d*). Each fan assembly 42 directly drives an integral alternator 50 which produces a flow of electrical current which is conducted thereto the voltage regulator assembly 140 which provides regulating and conditioning thereof said electrical power. Said electrical power may be used to directly power an electric motor portion 200 of the electric vehicle 15 and/or may be directed thereto the batteries 145 which are envisioned to be arranged thereat various locations within the vehicle 15 such as, but not limited to: a forward compartment, along side rocker-panel portions, therewithin a trunk area, or the like. The storage batteries 145 are envisioned to comprise a primary means to motion the electrically-powered motor vehicle 15 in a conventional manner.

Referring now to FIGS. 2*a*, 2*b*, and 2*c*, depicting front perspective, rear perspective, and cut-away views of a tunnel assembly portion 20 of the system 10, according to the preferred embodiment of the present invention, are disclosed. The tunnel assembly portion 20 of the system 10 comprises an upper removable panel 22, a lower enclosure 23, a front tunnel panel 24, a rear tunnel panel 25, a front tunnel opening 26, and a rear tunnel opening 28. The front 26 and rear 28 tunnel openings comprise large rectangular-shaped apertures formed therein respective front 24 and rear 25 tunnel panels, respectively. Said front 26 and rear 28 tunnel openings comprise outer perimeter edges being slightly smaller than that of the respective front 24 and rear 25 tunnel panels. The front 24 and rear 25 tunnel panels are envisioned to be orientated at an inward biased angle, thereby providing a matching aerodynamic angle with respect to adjacent body panels of the vehicle 15. It is further understood that the tunnel assembly 20 is to comprise particular shapes, edge-radii, contours, and the like, which may vary therefrom those depicted herein, being particularly designed and developed based upon aerodynamic testing, installation requirement of particular vehicle makes and models, and other specific requirements to yield desired stability and wind resistance efficiencies. The tunnel assembly 20 is envisioned to be made using lightweight metals such as aluminum or high-impact plastics such as performance polyester resins, fiberglass-impregnated plastic compounds, acrylonitrile butadiene styrene (ABS), or the like.

The tunnel assembly 20 provides an attachment means thereto the electric vehicle 15 via a plurality of equally-spaced weld stud fasteners 112 and corresponding locknut fasteners 114 being pre-installed therein a roof portion of the vehicle 15 and arranged at approximately six (6) inch centers, thereby allowing installation and removal of the tunnel assembly 20 therefrom the vehicle 15 by accessing said weld stud fasteners 112 and locknut fasteners 114 using the upper removable panel 22.

The upper removable panel portion 22 of the tunnel assembly 20 provides a means to sufficiently expose internal portions of the tunnel assembly 20 to perform maintenance and repair tasks thereupon the system 10, as required. The tunnel assembly 20 provides an attachment means therebetween the lower enclosure 23 and the upper removable panel 22 via a plurality of common axle-type hinges 116 arranged along a forward edge and a plurality of equally-spaced common fasteners 110 and fastener apertures 111 arranged therearound three (3) remaining side edges using fastening means such as screws, bolts, studs, or the like. The upper removable panel 22 further comprises an overlapping edge region having a gasket seal 118 therebetween said upper removable panel 22 and the mating lower enclosure 23 to seal out debris and liquids in an expected manner.

The system 10 preferably comprises six (6) fan assemblies 42 located therewithin the tunnel assembly 20 being arranged in two (2) rows, each comprising three (3) fan assemblies 42. Each fan assembly 42 is securely affixed thereto the upper removable panel 22 and lower enclosure 23 via a fan bearing 49 and an alternator mounting bracket 54, respectively. The alternator mounting bracket 54 is integrally incorporated thereinto a housing portion of the alternator 50 along a lower surface thereof, thereby enabling easy detachment therefrom the lower enclosure 23 for maintenance purposes (see FIG. 3b).

The tunnel assembly 20 is to be positioned above a wind shield portion of the vehicle 15, thereby directing a flow of entering air 100 thereinto the front tunnel opening 26. Said flow of entering air 100 passes therethrough said front tunnel opening 26; engages the fan assemblies 42; and, exits the tunnel assembly 20 as exiting air 105 therethrough the rear tunnel opening 28. The open area of the front 26 and rear 28 tunnel openings is controlled via a pair of motorized louvers 30 (see FIG. 2d). Once entering air 100 is inside the tunnel assembly 20, said air 100 is directed and subsequently compressed via a plurality of stationarily mounted baffle plates 80. The baffle plates 80 are affixed thereto the lower enclosure 23 and comprise contoured vertical panels being curved in an inward funneling manner to compress and direct the entering air 100 thereto the fan assemblies 42. In like manner, said baffle plates 80 curve in a divergent manner thereat a rear portion of the tunnel assembly 20 to depressurize the exiting air flow 105. The baffle plates 80 are envisioned to be made using similar materials as the aforementioned tunnel assembly 20. It is understood that specific design characteristics of said baffle plates 80 such as number of plates, position of plates, curvature and shape of said plates, and the like, may vary therefrom the illustration shown here based upon factors such as desired air flow dynamics, flow testing, engineering calculations, and the like, and as such should not be interpreted as a limiting factor of the system 10.

The fan assemblies 42 are arranged along right and left side portions of the tunnel assembly 20 so as to progressively protrude thereinto said air flow 100 approximately two (2) to three (3) inches between subsequent fan assemblies 42, thereby utilizing a linear force exerted by said entering air 100, thereby efficiently rotating the fan assemblies 42. A quantity of six (6) fan assemblies are illustrated here; however, it is understood that any practical number of fan assemblies 42 having respective geometries and dimensions, may be introduced based upon space limitations, desired electricity production, aerodynamic characteristics, and the like, and as such should not be interpreted as a limiting factor of the system 10 (see FIGS. 3a and 3b).

Referring now to FIG. 2d, a close-up view of a motorized louver portion 30 of the system 10, according to the preferred embodiment of the present invention is disclosed. The front tunnel opening 26 is depicted here comprising a motorized louver 30 and a screen panel 58. Both of the previously described tunnel openings 26, 28 comprise a motorized louver 30 and a screen panel 58 in a similar manner.

The motorized louver 30 provides a means to variably regulate a flow of air 100 therethrough said tunnel openings 26, 28. The motorized louver 30 comprises a rigid flat rectangular panel made using similar materials as the tunnel assembly 20 being affixed thereto a louver shaft 35 which extends along a long axis of said louver 30 thereat an intermediate location along a rear surface. The louver shaft 35 is affixed thereto using a plurality of "U"-shaped mounting brackets 36 and common fasteners 110. Each motorized louver 30 further comprises a pair of electric motors 34 which work in tandem fashion to apply a rotating torque thereto the louver shaft 35. Said electric motors 34 are coupled thereto opposing end portions of said louver shaft 35 in a non-rotating manner. As a flow of entering air 100 passes therethrough the tunnel assembly 20, a proportional analog signal enables the louver motor 34 to tilt the motorized louver 30 thereto a desired angle, thereby restricting a part or all of said air volume from passing therethrough. Operation of the motorized louver 30 is based upon primary automatic control therefrom the system control module 160 or may also be controlled manually using the system monitor 180 (see FIGS. 4 and 5). Each louver motor 34 is anchored thereto respective opposing inside surfaces of the lower enclosure 22 using integral motor mounting features of said louver motor 34 and common fasteners 110.

Located therebetween each motorized louver 30 and the fan assemblies 42 is a respective rectangular screen panel 58. Each screen panel 58 comprises a rigid coarse air filtration means which extends across the tunnel assembly 20 and is made using a fabricated metal screen material, thereby keeping bugs, airborne debris, and other items from entering the system 10. It is envisioned that the screen panels 58 may be easily removed for cleaning via access therethrough the aforementioned upper removable panel 22. It is expected that rain water is to pass therethrough the tunnel assembly portion 20 and screen panel portions 58 of the system 10 without interfering with the normal operation thereof.

Figure 2E:
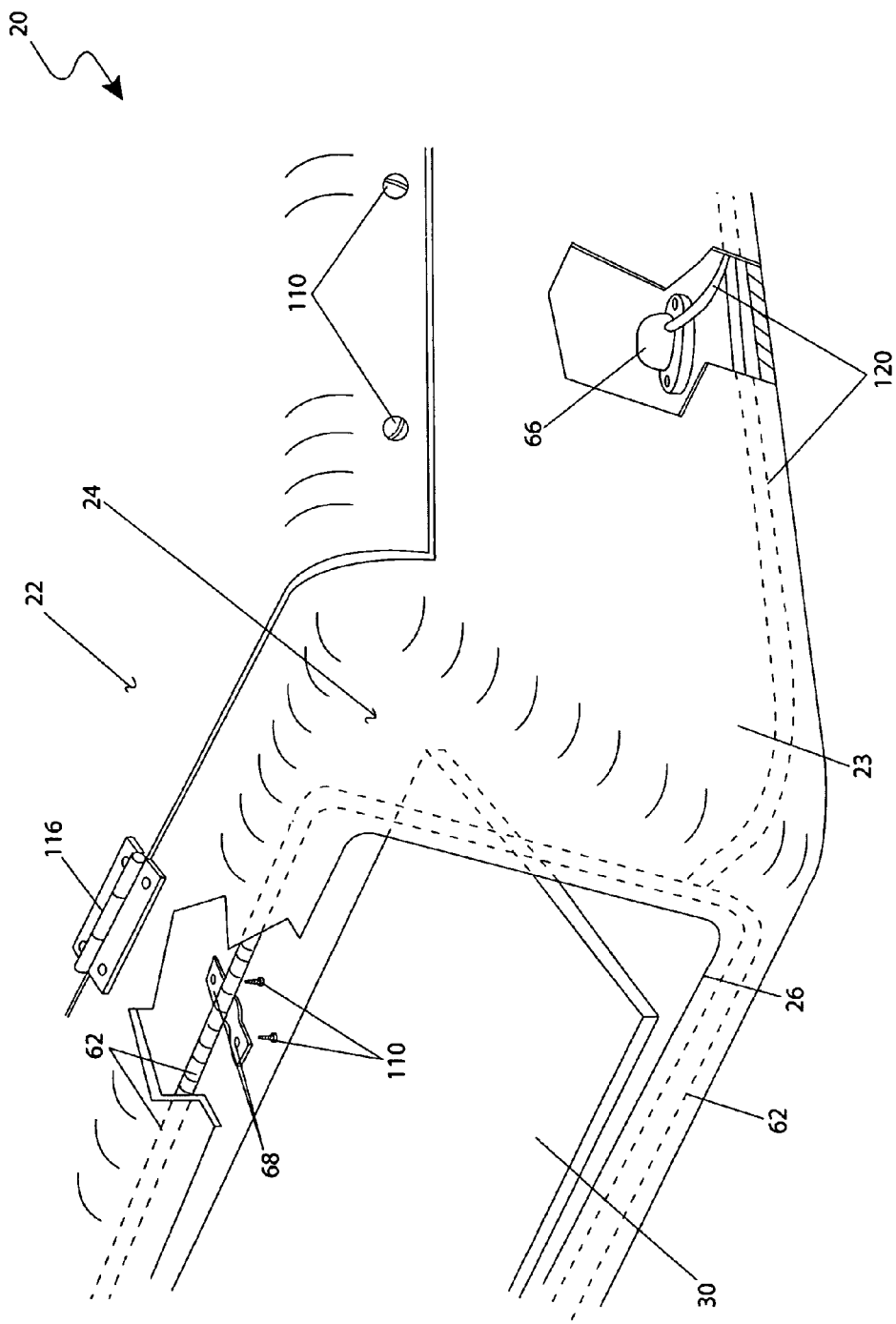
FIG. 2e is a close-up view of an air heating coil portion 62 of the air movement-powered charging system for electric motor vehicles 10, according to the preferred embodiment of the present invention.

Referring now to FIG. 2e, a close-up view of an air heating coil portion 62 of the system 10, according to the preferred embodiment of the present invention, is disclosed. The system 10 comprises a pair of air heating coils 62 providing heating of front 26 and rear 28 tunnel openings, respectively, to melt snow or ice which may enter the tunnel assembly 20 during inclement weather conditions. The air heating coils 62 work in conjunction therewith a temperature sensor 66 which provides temperature monitoring of air flowing therethrough the tunnel assembly 20. Said air heating coils 62 are affixed thereto the lower enclosure 23 being routed therearound an inner perimeter edge region of said front 26 and rear 28 tunnel openings being affixed thereto via a plurality of "U"-shaped mounting brackets 36 and common fasteners 110. Electrical power is supplied to the air heating coils 62 via wiring 120 therefrom the voltage regulator assembly portion 140 of the system 10 and automatically activated by software embedded therein the system control module 160 (see FIG. 5).

Figure 3A:
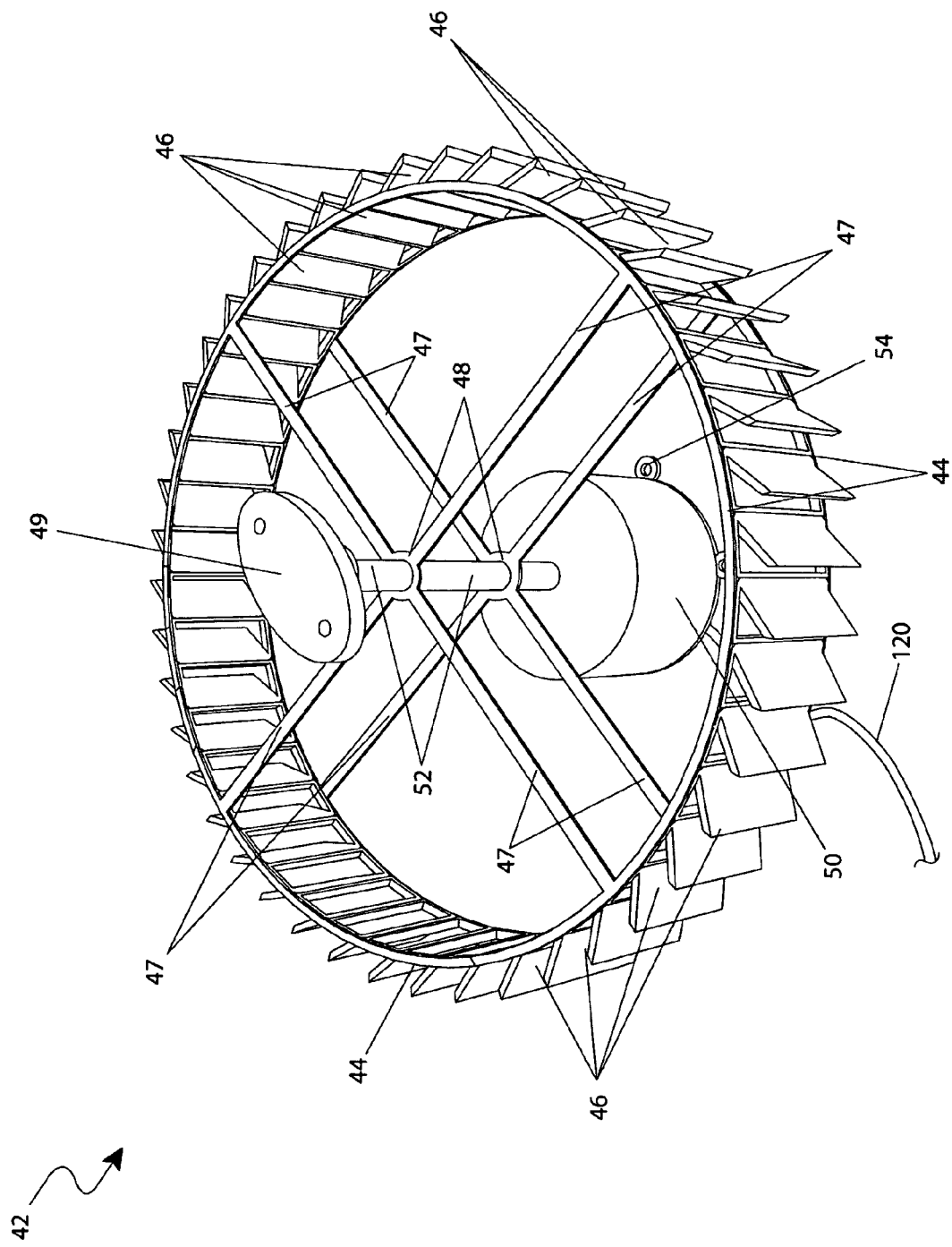
FIG. 3a is a top perspective view of a fan assembly portion 42 of the air movement-powered charging system for electric motor vehicles 10, according to the preferred embodiment of the present invention.
Figure 3B:
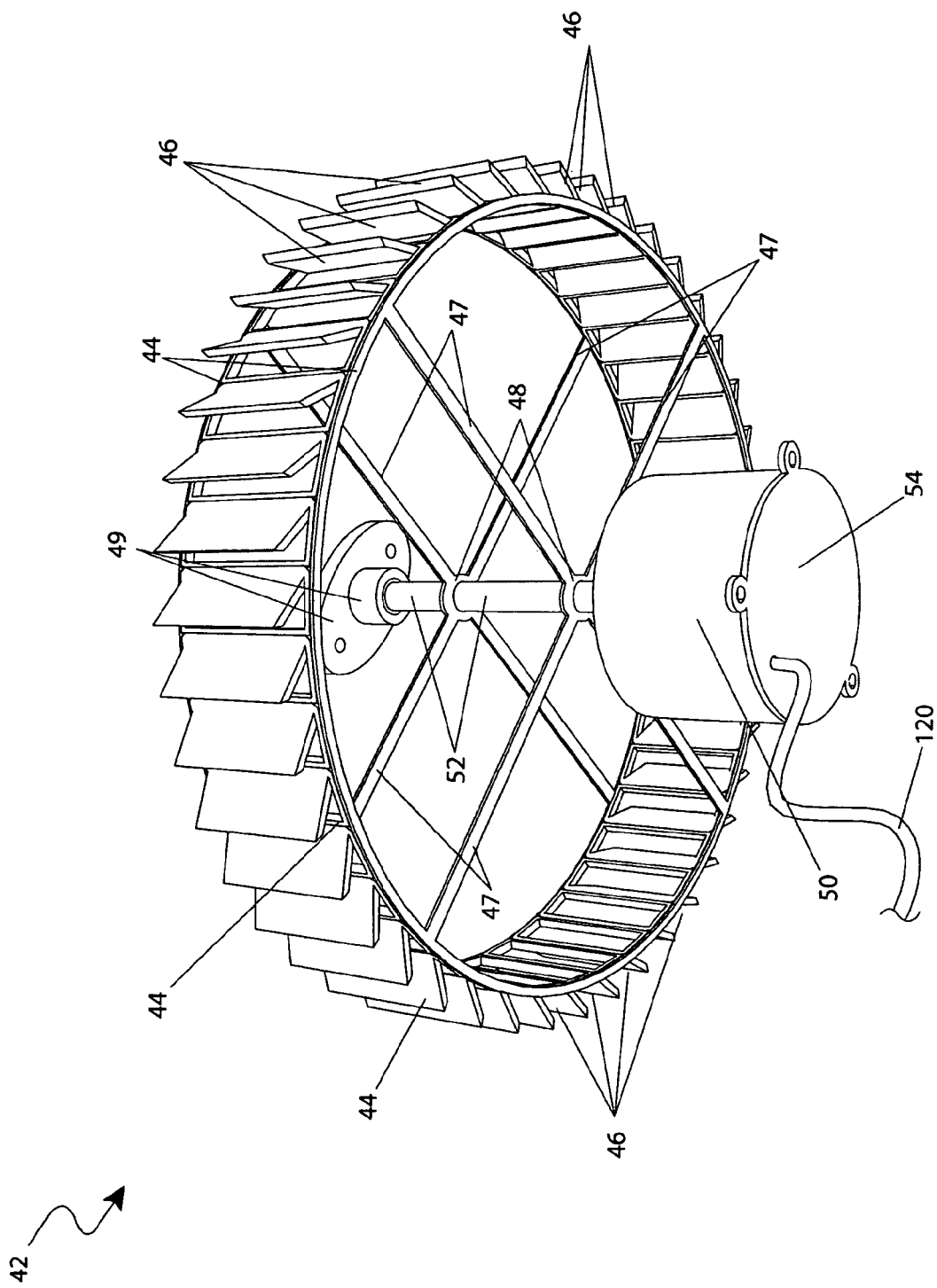
FIG. 3b is a bottom perspective view of a fan assembly portion 42 of the air movement-powered charging system for electric motor vehicles 10, according to the preferred embodiment of the present invention.

Referring now to FIGS. 3a and 3b, top and bottom perspective views of a fan assembly portion 42 of the system 10, according to the preferred embodiment of the present invention, are disclosed. Each fan assembly 42 comprises a fan frame 44, a fan bearing 49, an alternator 50, and an alternator shaft 52.

The fan frame 47 comprises a cylindrical shape approximately three (3) to five (5) inches tall envisioned to be made of light-weight metal or plastic forming a one-piece unit being approximately twenty-four (24) inches in diameter and rotating therein a horizontal plane therewithin the tunnel assembly 20. Arranged therealong an outer vertical surface of said fan frame 47 are a plurality of vertical fan blades 46 which comprise rectangular protrusions being integral thereto said fan frame 47. Said fan blades 46 are cut along three (3) sides and protruding outwardly in a parallel fashion as seen here. Said fan blades 46 are envisioned to be spaced at an approximate pitch of one (1) to three (3) inches therealong an outer perimeter area of said fan frame 47.

The fan frame 47 further comprises a plurality of integral fan spokes 47 which extend therefrom top and bottom perimeter edges of the fan frame 47 at right angles and extend inwardly thereto a pair of central hub portions 48 in a parallel manner along top and bottom horizontal planes. Said fan hub portions 48 provide a non-rotating attachment means thereto a central vertical alternator shaft portion 52 of the alternator 50. Said alternator shaft 52 extends in a downward direction thereto the alternator 50 being positioned slightly below the fan frame 47. Rotation of the fan frame 47 due to the aforementioned flow of entering air 100 subsequently rotates the alternator shaft 52 in a direct-drive manner to produce an electric current therefrom said alternator 50 in an expected manner.

Figure 4:
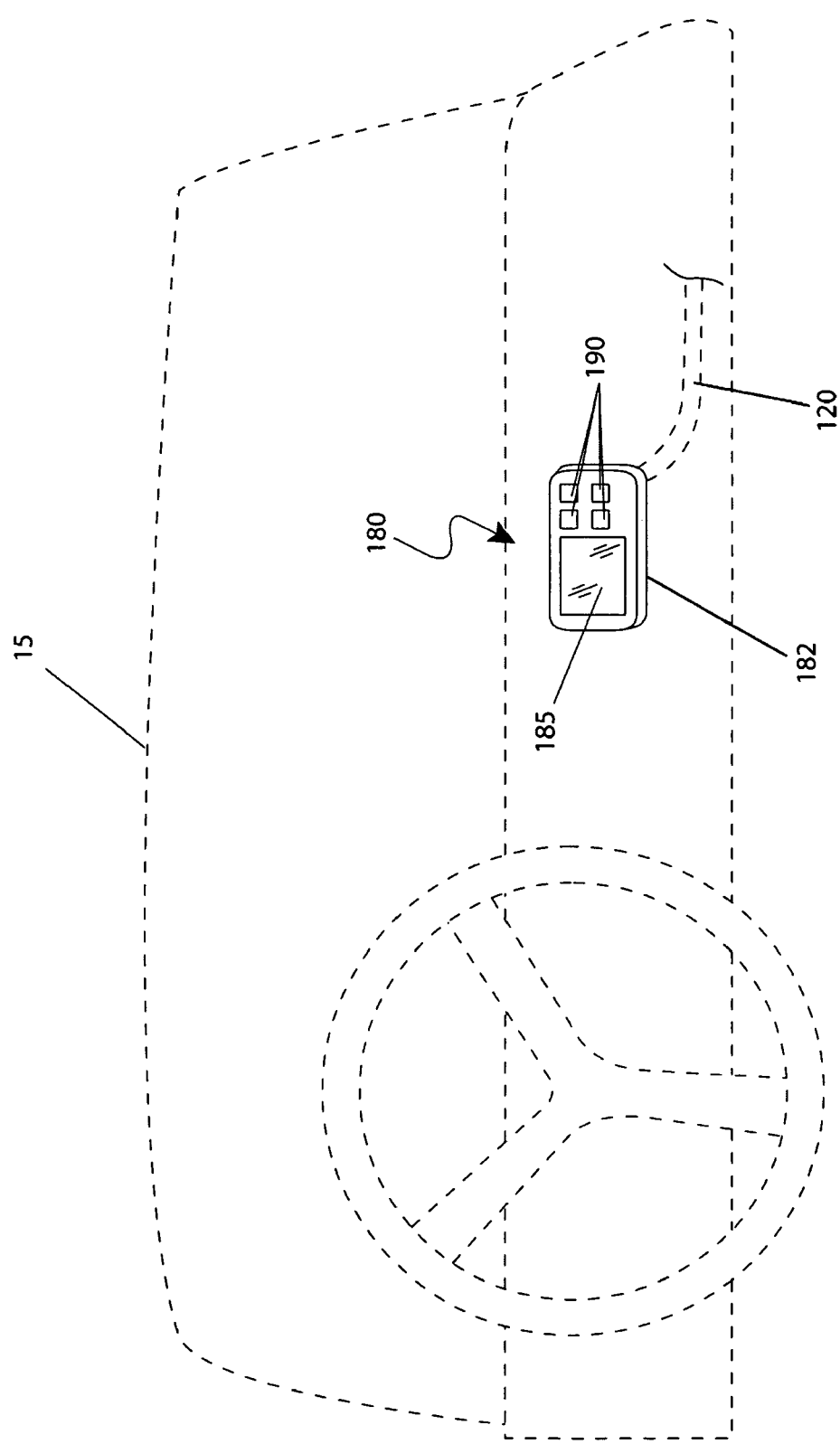
FIG. 4 is a close-up view of a system monitor portion 180 of the air movement-powered charging system for electric motor vehicles 10, according to the preferred embodiment of the present invention; and, FIG. 5 is an electrical block diagram disclosing the major electrical components as used with the air movement powered charging system for electric motor vehicles 10, according to the preferred embodiment of the present invention.

Referring now to FIG. 4, a close-up view of a system monitor portion 180 of the system 10 mounted thereto a vehicle dashboard area 210, according to the preferred embodiment of the present invention, is disclosed. The system 10 provides a user a means to monitor various system parameters such as, but not limited to: battery charge level, system activation/deactivation status, air flow volume, system faults, and the like, via a dashboard-mounted system monitor 180. Said system monitor 180 may be included as original equipment therewithin the electric vehicle 15 being permanently integrated thereinto the dashboard portion of said vehicle 15 or may be retrofitted thereto said dashboard portion in a similar manner as an aftermarket vehicle stereo system. The system monitor 180 comprises a plastic rectangular housing 182, a digital display 185 to display the aforementioned data, and a plurality of input push buttons 190 to access particular data, as well as interface therewith operation of the system 10. The system monitor 180 is in electronic communication therewith the system control module 160, thereby receiving and displaying data received therefrom said system control module 160 (see FIG. 5).

Figure 5:
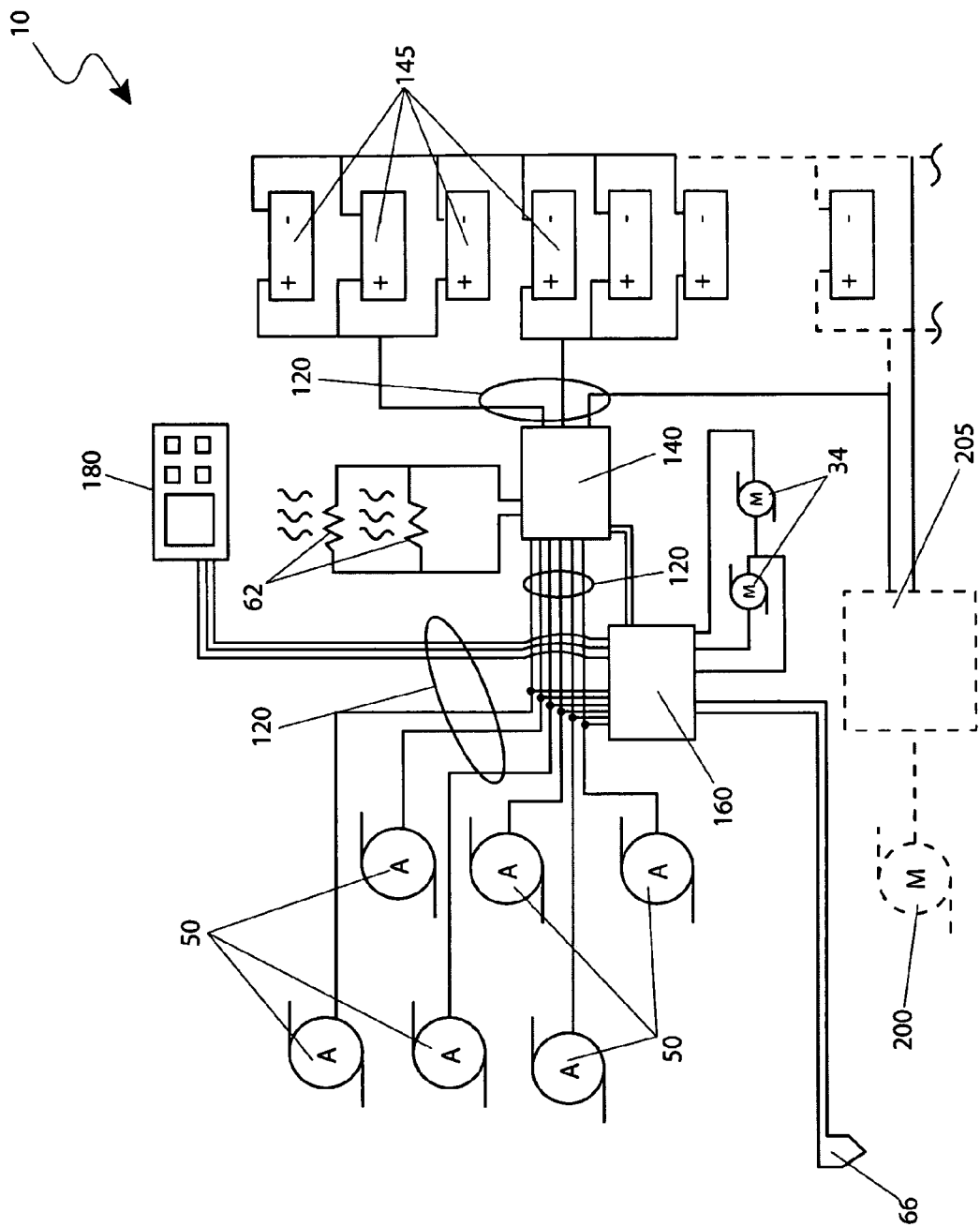

Referring now to FIG. 5, an electrical block diagram disclosing the major electrical components as used with the system 10, according to the preferred embodiment of the present invention, is disclosed. The features and components of the system 10 would be used in conjunction with the standard charging system which resides therewithin the electric vehicle 15. The block diagram of the system 10 illustrated here depicts a single arrangement of components being integrated thereinto an electric vehicle charging system 15; however, it is understood that arrangement of said components, wiring schematics, means of connecting the system 10 thereto a charging system of the electric vehicle 15, and other specific installed characteristics may vary based upon specific installation requirements, and as such should not be interpreted as a limiting factor of the system 10.

The system control module 160 provides overall control of the system 10. Said system control module 160 is envisioned to comprise a plastic enclosure and be located discreetly therewithin a dashboard portion of the electric vehicle 15. The system control module 160 comprises electronic and electrical components necessary for operation thereof the system 10. Said system control module 160 comprises components such as, but not limited to: circuit boards, relays, embedded software, a plurality of microprocessors, and the like. Said system control module 160 monitors current therefrom the alternators 50, monitors the temperature sensor 66, and outputs data thereto the system monitor 180. Power is supplied thereto the system control module 160 therefrom the voltage regulator assembly 140 and output thereto the louver motors 34 and system monitor 180 as directed by embedded software therewithin said system control module 160.

Electric power therefrom the alternators 50 is conducted therethrough respective electrical wiring 120 thereto the voltage regulator assembly 140 which provides regulation and conditioning of said electrical power for normal use in the electric vehicle 15. It is anticipated that each alternator 50 may produce a slightly different current level during operation, For example, one (1) alternator 50 may be producing one-hundred (100) amps while another alternator 50 may be producing one-hundred fifty (150) amps. The voltage regulator assembly 140 insures that the batteries 145 are to receive the same amperage and voltage at all times. The batteries 145 are depicted here being connected in a combination of series and parallel circuits to obtain a particular desired output voltage. It is understood that various arrangements of interconnected wiring 120 of said batteries 145 may be incorporated to produce other desired corresponding output voltages and as such should not be interpreted as a limiting factor of the system 10. Power from the batteries 145 is then provided thereto the electric car power controller 205 and subsequently thereto the electric vehicle motor 200.

Power is also provided thereto the air heating coils 62 from the voltage regulator module 140 as directed thereby the system control module 160 based upon an analog signal received therefrom the temperature sensor 66. It is envisioned that the system control module 160 is to provide power thereto the louver motors 34 to adjust said louvers 30 thereto a particular opening angle based upon monitored data such as a current battery charge level, alternator output 50, system activation/deactivation status, and the like.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. It is envisioned that the system 10 would be installed and utilized in general accordance with FIG. 1. The system 10 is envisioned as being installed as original equipment on a conventional electric vehicle 15. The features as presented by the system 10 would be integrated therewith and function in conjunction with the standard charging system of the electric vehicle 15. In addition, the system 10 could be provided in kit format for aftermarket installation on existing electric vehicles 15 to provide a continuous charging current thereto on-board batteries 145 and/or the electric vehicle motor 200. After installation and check-out, the system 10 is ready for operation.

The method of installing an aftermarket kit version of the system 10 may be achieved by performing the following steps: procuring a particular model of the system 10 comprising a tunnel assembly portion 20 particularly sized and contoured for an anticipated electric vehicle 15; pre-installing a plurality of weld stud fasteners 112 along a roof line of said vehicle 15 being arranged so as to match corresponding fastening features of the tunnel assembly 20; installing and securing the tunnel assembly 20 by threadingly installing and tightening the locknut fasteners 114 thereto the weld stud fasteners 112; installing the major components of the system 10 throughout the vehicle 15 including the voltage regulator assembly 140, system control module 160, batteries 145, and system monitor 180, based upon available space and access characteristics; routing electrical wiring 120 discreetly within body panels and interior spaces of the electric vehicle 15 to interconnect said system components; and, connecting the system 10 electrically and electronically therewith the existing vehicle charging system.

Once installed, operation of the system 10 may be achieved by performing the following steps: initiating power to the system 10 by pressing appropriate input push buttons 190 thereupon the system monitor 180; operating the system 10 in an automatic manner during normal driving; manually configuring the operation of the system 10, if desired, using said input buttons 190 and digital display 185 portions of the system monitor 180, thereby altering particular system characteristics such as an angle of one (1) or both louvers 30, manually initiating of the air heating coils 62, and the like; operating the electric vehicle 15 thereto a desired destination in a normal manner; providing a flow of current therefrom the alternators 50 thereto the batteries 145 and/or electric vehicle motor 200 while the vehicle 15 is in motion.

During utilization of the system 10, entering air 100 flows therethrough the tunnel assembly 20 causing rotation of the fan assemblies 42. Rotation of said fan assemblies 42 and affixed alternators 50 produces a flow of current thereto the voltage regulator assembly 140 where said current is conditioned and conducted thereto the batteries 145. Based upon current draw from the electric vehicle motor 200 and/or said batteries 145, the system control module 160 will provide volumetric regulation of entering air 100 and subsequent power generated by proportionally adjusting an angle of the motorized louvers 30. As such, current generated by the system 10 will allow the electric vehicle 15 to travel greater distances, have increased efficiency, and provide an increase in performance when equipped with the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A charging system for a motor vehicle, comprising:
   an air tunnel assembly affixed to a roof of said motor vehicle by an attachment means;
   a plurality of fan assemblies in fluid communication with said air tunnel assembly, each mounted within said air tunnel assembly;
   an electrical generation means in mechanical communication with each of said plurality of fan assemblies;
   an electrical power storage means in electrical communication with said electrical generation means; and,
   a control means for controlling said charging system;
   wherein said air tunnel assembly provides internal compression and velocity control thereto said flow of air
   wherein a flow of air travels through said air tunnel assembly;
   wherein said air tunnel assembly comprises a generally rectangular open-ended box, further comprising:
      a front tunnel opening formed in a front tunnel panel, wherein said flow of air enters;
      an interior, wherein said plurality of fan assemblies are affixed therein;
      a rear tunnel opening formed in a rear tunnel panel, wherein said flow of air is exhausted;
      an upper removable panel portion, thereby providing access to said interior;
      a lower enclosure hingedly attachable to said upper removable panel portion at a forward edge and a fastening means at a rear edge;
      a front motorized louver mounted to said front tunnel panel and a rear motorized louver mounted to said rear tunnel panel, each louver comprising:
         a rigid flat rectangular panel affixed to a louver shaft extending along a long axis of said louver at an intermediate location along a rear surface of; and,
         a pair of electric motors in electrical communication with said control means coupled to opposing end portions of said louver shaft and anchored to opposing inside surfaces of said lower enclosure; and,
      a screen panel mounted in said enclosure between said plurality of fan assemblies and said front motorized louver and said rear motorized louver, each screen panel further comprising a rigid coarse air filter means;
   wherein said each louver provides a means to variably regulate said flow of air, whereby said pair of electric motors receives a command from said control means to tilt said louver to a desired angle, thereby restricting a part or all of said air volume from passing through said air tunnel assembly;
   wherein each screen panel provides an air filtration means or said air tunnel assembly;
   wherein said flow of air drives said plurality of fan assemblies;
   wherein said plurality of fan assemblies drives said electrical generation means;
   wherein said electrical generation means produces said electrical power; and,
   wherein said control means selectively directs said electrical power to said motor vehicle for provides a driving means or to said electrical power storage means.

2. The charging system of claim 1, wherein said upper removable panel further comprises an overlapping edge region having a gasket seal between said upper removable panel and said lower enclosure to provide a sealing means.

3. The charging system of claim 1, wherein said front tunnel panel and said rear tunnel panel are orientated at an inward biased angle, thereby providing a matching aerodynamic angle with respect to adjacent body panels of said motor vehicle.

4. The charging system of claim 1, wherein said air tunnel assembly further comprises:
   a plurality of front-mounted baffle plates affixed to said lower enclosure in said interior adjacent to said front tunnel opening, each comprising a contoured vertical panel inwardly curved in a funneling manner to compress and direct said flow of air entered from said front tunnel opening to said plurality of fan assemblies; and,
   a plurality of rear-mounted baffle plates affixed to said lower enclosure in said interior adjacent to said rear tunnel opening, each comprising a contoured vertical panel outwardly curved in a funneling manner to depressurize and direct said flow of air exiting from said plurality of fan assemblies and to said rear tunnel opening.

5. The charging system of claim 1, wherein said air tunnel assembly further comprises an air heating coil in electrical communication with said control means, affixed to said lower enclosure, and routed around an inner perimeter edge of each of said front tunnel opening and said rear tunnel opening a mounting bracket;
   wherein said air heating coil provides a heating means to said flow of air entering said front tunnel opening and exiting said rear tunnel opening.

6. The charging system of claim 1, wherein said air tunnel assembly comprises a width of approximately four to six feet, a length of approximately six to eight feet, and a height of approximately four to eight inches.

7. The charging system of claim 1, wherein said plurality of fan assemblies are each affixed to said upper removable panel with a fan bearing, each fan assembly further comprises:
   a fan frame, comprising a cylindrical shape of light-weight material rotating in a horizontal plane within said interior of said air tunnel assembly;
   a plurality of fan blades affixed along an outer vertical surface of said fan frame; and,
   a plurality of integral fan spokes perpendicularly extending from a top and a bottom perimeter edge of said fan frame and inwardly to a pair of central hub portions in a parallel manner along top and bottom horizontal planes.

8. The charging system of claim 7, wherein said plurality of fan assemblies comprises an orientation means enabling each of said plurality of fan assemblies to progressively protrude into said flow of air, thereby utilizing a linear force exerted by said flow of air to efficiently rotating each of said plurality of fan assemblies.

9. The charging system of claim 8, wherein said orientation means further comprises six fan assemblies arranged in two rows along a right side and a left side of said interior of said air tunnel assembly.

10. The charging system of claim 7, wherein said electrical generating means mounted to said lower enclosure with an alternator mounting bracket, further comprising:
   an alternator shaft attached to said pair of central hub portions at a first end and extending downwardly;
   an alternator oriented subjacent to said fan frame and attached to a second end thereof said alternator shaft;
   a voltage regulator assembly in electrical communication said alternator; and,
   said electrical power storage means comprising a plurality of batteries in electrical communication said voltage regulator assembly and mounted in said motor vehicle;
   wherein said flow of air rotatably drives said fan frame and said alternator shaft;
   wherein said alternator produces said electrical power upon rotation of said alternator shaft;
   wherein said pair of central hub portions provide a non-rotating attachment means to said alternator shaft portion;
   wherein said voltage regulator assembly provides regulation and conditioning of said electrical power for use within said motor vehicle;
   wherein said plurality of batteries are connected in a combination of series and parallel circuits to obtain a particular desired output voltage; and,
   wherein said plurality of batteries provides a storage means for said electrical power and a driving means to said motor vehicle as selectively controlled by said control means.

11. The charging system of claim 10, wherein said control means further comprises:
   a system control module;
   a system monitor in electronic communication said system control module for monitoring a plurality of system parameters, further comprising a housing mounted in an interior of said motor vehicle;
   a display for displaying said plurality of system parameters; and,
   a plurality of input keys to access said plurality of system parameters and to interface said charging system;
   wherein said system control module provides a louver controlling means to a motorized louver located at said front tunnel opening and said rear tunnel opening, an electrical power directing means for said electrical power to said plurality of batteries and said motor vehicle, said heating means to an air heating coil located at said front tunnel opening and said rear tunnel opening.

12. The charging system of claim 11, wherein said plurality of system parameters includes the following list: an activation of said charging system, a deactivation of said charging system, an amount of electrical current generated by each alternator, a battery charge level for said plurality of batteries, and an air flow volume of said flow of air, and a temperature of said flow of air.

13. The charging system of claim 12, wherein a temperature sensor is located in said interior of said air tunnel assembly and provides said louver controlling means based on a sensed temperature and a desired temperature.

14. A charging system for a motor vehicle, comprising:
   an air tunnel assembly mounted thereto a roof of said motor vehicle comprising a rectangular open-ended box, further comprising:
      a front tunnel opening formed in a front tunnel panel, wherein said flow of air enters and orientated at an inward biased angle, thereby providing a matching aerodynamic angle with respect to adjacent body panels of said motor vehicle;
      an interior, wherein said plurality of fan assemblies are affixed therein;
      a rear tunnel opening formed in a rear tunnel panel, wherein said flow of air is exhausted and orientated at an inward biased angle, thereby providing a matching aerodynamic angle with respect to adjacent body panels of said motor vehicle;
      an upper removable panel portion comprising an overlapping edge region, thereby providing access to said interior;
      a lower enclosure hingedly attachable to said upper removable panel portion at a forward edge and a fastening means at a rear edge; and,
      a gasket seal between said upper removable panel and said lower enclosure to providing a sealing means;
   a plurality of fan assemblies in fluid communication with said air tunnel assembly, each affixed to said upper removable panel with a fan bearing, each fan assembly further comprises:
      a fan frame, comprising a cylindrical shape of light-weight material rotating in a horizontal plane within said interior of said air tunnel assembly;
      a plurality of fan blades affixed along an outer vertical surface of said fan frame; and,
      a plurality of integral fan spokes perpendicularly extending a top and a bottom perimeter edge of said fan frame and inwardly to a pair of central hub portions in a parallel manner along top and bottom horizontal planes;
      a plurality of front-mounted baffle plates affixed to said lower enclosure in said interior adjacent to said front tunnel opening, each comprising a contoured vertical panel inwardly curved in a funneling manner to compress and direct said flow of air entered from said front tunnel opening to said plurality of fan assemblies; and,
      a plurality of rear-mounted baffle plates affixed to said lower enclosure in said interior adjacent to said rear tunnel opening, each comprising a contoured vertical panel outwardly curved in a funneling manner to depressurize and direct said flow of air exiting from said plurality of fan assemblies and to said rear tunnel opening;

a front motorized louver mounted to said front tunnel panel and a rear motorized louver mounted to said rear tunnel panel, each louver comprising:
- a rigid flat rectangular panel affixed to a louver shaft extending along a long axis of said louver at an intermediate location along a rear surface thereof; and,
- a pair of electric motors coupled to opposing end portions of said louver shaft and anchored to opposing inside surfaces of said lower enclosure;

a screen panel mounted in said enclosure between said plurality of fan assemblies and said front motorized louver and said rear motorized louver, each screen panel further comprising a rigid coarse air filter means;

an air heating coil affixed to said lower enclosure and routed around an inner perimeter edge of each of said front tunnel opening and said rear tunnel opening with a mounting bracket;

an electrical generation means in mechanical communication with each of said plurality of fan assemblies and mounted in said lower enclosure with an alternator mounting bracket, further comprising:
- an alternator shaft attached to said pair of central hub portions at a first end and extending downwardly;
- an alternator oriented subjacent to said fan frame and attached to a second end of said alternator shaft;
- a voltage regulator assembly in electrical communication said alternator; and,
- a plurality of batteries in electrical communication said voltage regulator assembly and mounted in said motor vehicle; and, a control means for controlling said charging system, further comprising:
- a system control module, wherein said system control module provides a louver controlling means to said motorized louvers located at said front tunnel opening and said rear tunnel opening, an electrical power directing means for said electrical power to said plurality of batteries and said motor vehicle, said heating means to said air heating coil located at said front tunnel opening and said rear tunnel opening;
- a system monitor in electronic communication said system control module for monitoring a plurality of system parameters, further comprising a housing mounted in an interior of said motor vehicle;
- a display for displaying said plurality of system parameters;
- a plurality of input keys to access said plurality of system parameters and to interface said charging system; and,
- a temperature sensor located in said interior of said air tunnel assembly providing a louver controlling means based on a sensed temperature and a desired temperature;

wherein a flow of air travels through said air tunnel assembly;

wherein said flow of air drives said plurality of fan assemblies;

wherein said plurality of fan assemblies drives said electrical generation means;

wherein said electrical generation means produces said electrical power; and, wherein said control means selectively directs said electrical power to said motor vehicle for provides a driving means or to said electrical power storage means.

15. The charging system of claim 14, wherein said air tunnel assembly comprises a width of approximately four to six feet, a length of approximately six to eight feet, and a height of approximately four to eight inches.

16. The charging system of claim 14, wherein said plurality of fan assemblies further comprise six fan assemblies arranged in two rows along a right side and a left side of said interior of said air tunnel assembly, thereby enabling each of said plurality of fan assemblies to progressively protrude into said flow of air, thereby utilizing a linear force exerted by said flow of air to efficiently rotating each of said plurality of fan assemblies.

17. The charging system of claim 14, wherein said plurality of system parameters includes the following list: an activation of said charging system, a deactivation of said charging system, an amount of electrical current generated thereby each alternator, a battery charge level for said plurality of batteries, and an air flow volume of said flow of air, and a temperature of said flow of air.

* * * * *